US011082969B2

(12) United States Patent
Tang et al.

(10) Patent No.: US 11,082,969 B2
(45) Date of Patent: Aug. 3, 2021

(54) SLOT INDICATION METHOD, ACCESS NETWORK DEVICE, AND USER EQUIPMENT

(71) Applicant: Huawei Technologies Co., Ltd., Shenzhen (CN)

(72) Inventors: Zhenfei Tang, Ottawa (CA); Fan Wang, Berkshire (GB); Zukang Shen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/686,752

(22) Filed: Nov. 18, 2019

(65) Prior Publication Data
US 2020/0092862 A1   Mar. 19, 2020

Related U.S. Application Data

(63) Continuation of application No. PCT/CN2018/087433, filed on May 18, 2018.

(30) Foreign Application Priority Data

May 18, 2017  (CN) .......................... 201710354252.8

(51) Int. Cl.
  *H04L 12/28* (2006.01)
  *H04W 72/04* (2009.01)
  (Continued)

(52) U.S. Cl.
  CPC ......... *H04W 72/042* (2013.01); *H04L 5/0001* (2013.01); *H04L 5/0044* (2013.01);
  (Continued)

(58) Field of Classification Search
  CPC .......... H04W 72/0446; H04W 72/0453; H04L 27/2666
  (Continued)

(56) References Cited

U.S. PATENT DOCUMENTS

2016/0254948 A1   9/2016  Chen et al.
2019/0274172 A1*  9/2019  Yoon ................. H04W 74/0866
2020/0137737 A1*  4/2020  Jo ........................... H04L 5/001

FOREIGN PATENT DOCUMENTS

CN   105706489 A    6/2016
WO   2016180491 A1  11/2016

OTHER PUBLICATIONS

Huawei et al., "Contents of group-common PDCCH," 3GPP TSG RAN WG1 Meeting #89, R1-1708146, Hangzhou, China, May 15-29, 2017, 4 pages.
(Continued)

*Primary Examiner* — John Pezzlo
(74) *Attorney, Agent, or Firm* — Slater Matsil, LLP

(57) ABSTRACT

A method includes: determining, by an access network device, at least one piece of downlink control information, where the downlink control information includes at least one slot format indication; and sending, by the access network device, the downlink control information to a group of user equipment on a group common downlink control channel, where the group of user equipment operates in M bandwidth parts, the at least one slot format indication is used to indicate a slot format corresponding to N numerologies of the M bandwidth parts, and both N and M are positive integers greater than 1.

14 Claims, 4 Drawing Sheets

(51) Int. Cl.
  *H04L 5/00* (2006.01)
  *H04J 1/16* (2006.01)
(52) U.S. Cl.
  CPC .......... *H04L 5/0053* (2013.01); *H04L 5/0094* (2013.01); *H04W 72/0446* (2013.01); *H04W 72/0453* (2013.01)
(58) Field of Classification Search
  USPC ........................................ 370/252, 329, 430
  See application file for complete search history.

(56) References Cited

OTHER PUBLICATIONS

Intel Corporation, "Bandwidth parts configuration and operations," 3GPP TSG RAN WG1 Meeting #89, Hangzhou, China, May 15-29, 2017, 6 pages.
CATT, "Group-common PDCCH structure and configuration," 3GPP TSG RAN WG1 Meeting #89; R1-1707500, Hangzhou, P. R. China, May 15-19, 2017; 5 pages.
3rd Generation Partnership Project;Technical Specification Group Radio Access Network; NR; Radio Resource Control (RRC); Protocol specification (Release 15 ); 3GPP TS 38.331 V0.0.3 (May 2017), 20 pages.
Intel Corporation, "Group Common PDCCH," 3GPP TSG RAN WG1 #88; R1-1702219, Athens, Greece, Feb. 13-17, 2017, 4 pages.
Hiuawei et al., "UE-group common control signaling," 3GPP TSG-RAN WG1 Meeting #88, R1-1701637, Athens, Greece, Feb. 13-17, 2017, 3 pages.
MCC Support, "Final Report of 3GPP TSG RAN WG1 #88 v1.0.0 (Athens, Greece, Feb. 13-17, 2017)," 3GPP TSG RAN WG1 Meeting #88bis, R1-1704172, Spokane, USA, Apr. 3-7, 2017, 152 pages.

\* cited by examiner

SLOT INDICATION METHOD, ACCESS NETWORK DEVICE, AND USER EQUIPMENT

CROSS-REFERENCE TO RELATED APPLICATIONS

This application is a continuation of International Application No. PCT/CN2018/087433, filed on May 18, 2018, which claims priority to Chinese Patent Application No. 201710354252.8, filed on May 18, 2017. The disclosures of the aforementioned applications are hereby incorporated by reference in their entireties.

TECHNICAL FIELD

This application relates to the communications field, and in particular, to a slot indication method, an access network device, and user equipment.

BACKGROUND

In new radio (NR), a fifth-generation radio access system standard, a basic unit in frequency domain is one subcarrier, and a basic unit in time domain is one orthogonal frequency division multiplexing (OFDM) symbol. A resource element (RE) is a smallest physical resource, and includes one subcarrier in one OFDM symbol.

During standardization of the new radio (NR) of the 5th generation (5G) mobile communications, a basic scheduling unit in time domain is a slot or a mini-slot, both of which are referred to as a slot herein for brevity. A slot includes several OFDM symbols. A slot may be divided into a control area and a data area. A downlink control channel (PDCCH) carries control information, for example, downlink control information (DCI). The downlink control channel includes a group common physical downlink control channel (Group Common PDCCH) and a user-equipment-specific downlink control channel (UE-specific PDCCH).

In addition, NR supports flexible slot formats. To be specific, symbols in one slot may be all used to transmit uplink data, all used to transmit downlink data, partially used to transmit uplink data, or partially used to transmit downlink data. A slot format may also be understood as a slot format or slot format related information. The slot format may be indicated by using control information carried on the group common physical downlink control channel.

In addition, it is proposed during a current discussion about the 5G system that because a maximum bandwidth of one carrier can reach 400 MHz, considering that user equipment (UE) is limited by a maximum bandwidth capability, when the maximum bandwidth capability of the UE is inferior to a bandwidth capability of the carrier, a base station is unable to allocate a resource directly to the UE within a bandwidth range of the carrier. In this case, the base station allocates a resource to the UE in two steps: In a first step, the base station indicates a bandwidth part (BP) to the UE; and in a second step, the base station allocates a resource to the UE within a range of the BP. Therefore, different UEs may use different BPs, and each UE may use more than one BP.

Different BPs may use different numerologies, and different numerologies correspond to different slot formats. Therefore, how to indicate, on a group common physical downlink control channel, a slot format used by a BP of each UE needs an urgent solution.

SUMMARY

Embodiments of this application provide a slot indication method, a control information receiving method, an access network device, and user equipment, so that a slot format corresponding to a numerology of a bandwidth part in which the user equipment operates can be indicated to the user equipment.

According to a first aspect, a slot indication method is provided, including: determining, by an access network device, at least one piece of downlink control information, where the downlink control information includes at least one slot format indication; and sending, by the access network device, the downlink control information to a group of user equipment on a group common downlink control channel, where the group of user equipment operates in M bandwidth parts, the at least one slot format indication is used to indicate a slot format corresponding to N numerologies of the M bandwidth parts, and both N and M are positive integers greater than 1.

In a first design, according to the first aspect, the slot format includes a symbol type in one slot.

[Don] In a second design, according to the first aspect or the first design of the first aspect, the at least one slot format indication is N slot format indications.

In a third design, according to the second design of the first aspect, the at least one piece of downlink control information is one piece of downlink control information, the downlink control information includes N information fields, and each of the N information fields corresponds to one slot format indication.

In a fourth design, according to the third design of the first aspect, the N information fields are obtained through division on a bit basis.

In a fifth design, according to the third design or the fourth design of the first aspect, the method further includes: sending, by the access network device, a correspondence between the N information fields and the N numerologies to the user equipment.

In a sixth design, according to the second design of the first aspect, the at least one piece of downlink control information is N pieces of downlink control information, and each of the N pieces of downlink control information corresponds to one slot format indication.

In a seventh design, according to the sixth design of the first aspect, the N pieces of downlink control information correspond to the N numerologies, each of the N numerologies includes one identifier, and the identifier is used to scramble corresponding downlink control information.

In an eighth design, according to the first aspect or the first design of the first aspect, the at least one piece of downlink control information is one piece of downlink control information, the at least one slot format indication is one reference slot format indication, and the reference slot format indication is used to indicate a slot format for a reference numerology in the N numerologies.

In a ninth design, according to the eighth design of the first aspect, a subcarrier spacing corresponding to the reference numerology is a minimum value of a subcarrier spacing corresponding to the N numerologies, or the reference numerology is a predefined numerology.

In a tenth design, according to the first aspect or any of the previous designs of the first aspect, a value of N is determined in at least one of the following manners: the value of N corresponds to a quantity of numerologies supported by the access network device; the value of N corresponds to a frequency range; or the value of N is indicated to the user equipment by the access network device by using a physical broadcast channel or a system message.

According to a second aspect, a slot indication method is provided, including: receiving, by user equipment on a group common downlink control channel, at least one piece of downlink control information sent by an access network device to a group of user equipment, where the user equipment is one of the group of user equipment, the downlink control information includes at least one slot format indication, the group of user equipment operates in M bandwidth parts, the at least one slot format indication is used to indicate a slot format corresponding to N numerologies of the M bandwidth parts, and both N and M are positive integers greater than 1; and determining, by the user equipment based on the downlink control information, a slot format for a bandwidth part corresponding to the user equipment.

In a first design, according to the second aspect, the slot format includes a symbol type in one slot.

In a second design, according to the second aspect or the first design of the second aspect, the at least one slot format indication is N slot format indications.

In a third design, according to the second design of the second aspect, the at least one piece of downlink control information is one piece of downlink control information, the downlink control information includes N information fields, and each of the N information fields corresponds to one slot format indication.

In a fourth design, according to the third design of the second aspect, the N information fields are obtained through division on a bit basis.

In a fifth design, according to the third design or the fourth design of the second aspect, the method further includes: receiving, by the user equipment, a correspondence between the N information fields and the N numerologies that is sent by the access network device.

In a sixth design, according to the second design of the second aspect, the at least one piece of downlink control information is N pieces of downlink control information, and each of the N pieces of downlink control information corresponds to one slot format indication.

In a seventh design, according to the sixth design of the second aspect, the N pieces of downlink control information correspond to the N numerologies, each of the N numerologies includes one identifier, and the identifier is used to scramble corresponding downlink control information.

In an eighth design, according to the second aspect or the first design of the second aspect, the at least one piece of downlink control information is one piece of downlink control information, the at least one slot format indication is one reference slot format indication, the reference slot format indication is used to indicate a slot format for a reference numerology in the N numerologies, and the determining, based on the downlink control information, a slot format for a bandwidth part in the method specifically includes: determining, by the user equipment, the slot format for the bandwidth part based on the reference numerology and the reference slot format.

In a ninth design, according to the eighth design of the second aspect, a subcarrier spacing corresponding to the reference numerology is a minimum value of a subcarrier spacing corresponding to the N numerologies, or the reference numerology is a predefined numerology.

In a tenth design, according to the second aspect or any of the previous designs of the second aspect, a value of N is determined in at least one of the following manners: the value of N corresponds to a quantity of numerologies supported by the access network device; the value of N corresponds to a frequency range; or the value of N is indicated to the user equipment by the access network device by using a physical broadcast channel or a system message.

According to a third aspect, an access network device is provided, including: a processor, configured to determine at least one piece of downlink control information, where the downlink control information includes at least one slot format indication; and a transceiver, configured to send the downlink control information to a group of user equipment on a group common downlink control channel, where the group of user equipment operates in M bandwidth parts, the at least one slot format indication is used to indicate a slot format corresponding to N numerologies of the M bandwidth parts, and both N and M are positive integers greater than 1.

For the downlink control information, a value of N, and the like in the third aspect, refer to corresponding descriptions in the first aspect. Details are not described herein again.

According to a fourth aspect, user equipment is provided, including: a transceiver, configured to receive, on a group common downlink control channel, at least one piece of downlink control information sent by an access network device to a group of user equipment, where the user equipment is one of the group of user equipment, the downlink control information includes at least one slot format indication, the group of user equipment operates in M bandwidth parts, the at least one slot format indication is used to indicate a slot format corresponding to N numerologies of the M bandwidth parts, and both N and M are positive integers greater than 1; and a processor, configured to determine, based on the downlink control information, a slot format for a bandwidth part corresponding to the user equipment.

For the downlink control information, a value of N, and the like in the fourth aspect, refer to corresponding descriptions in the second aspect. Details are not described herein again.

According to the slot indication method, the access network device, and the user equipment provided in the foregoing aspects, when user equipment operate in one or more bandwidth parts, the access network device can indicate, to each UE by using downlink control information on a group common control channel, a slot format used by a bandwidth part of the UE. This saves channel resources and improves transmission efficiency, thereby meeting requirements of a next-generation wireless communications system.

DETAILED DESCRIPTION OF ILLUSTRATIVE EMBODIMENTS

Figure 1:
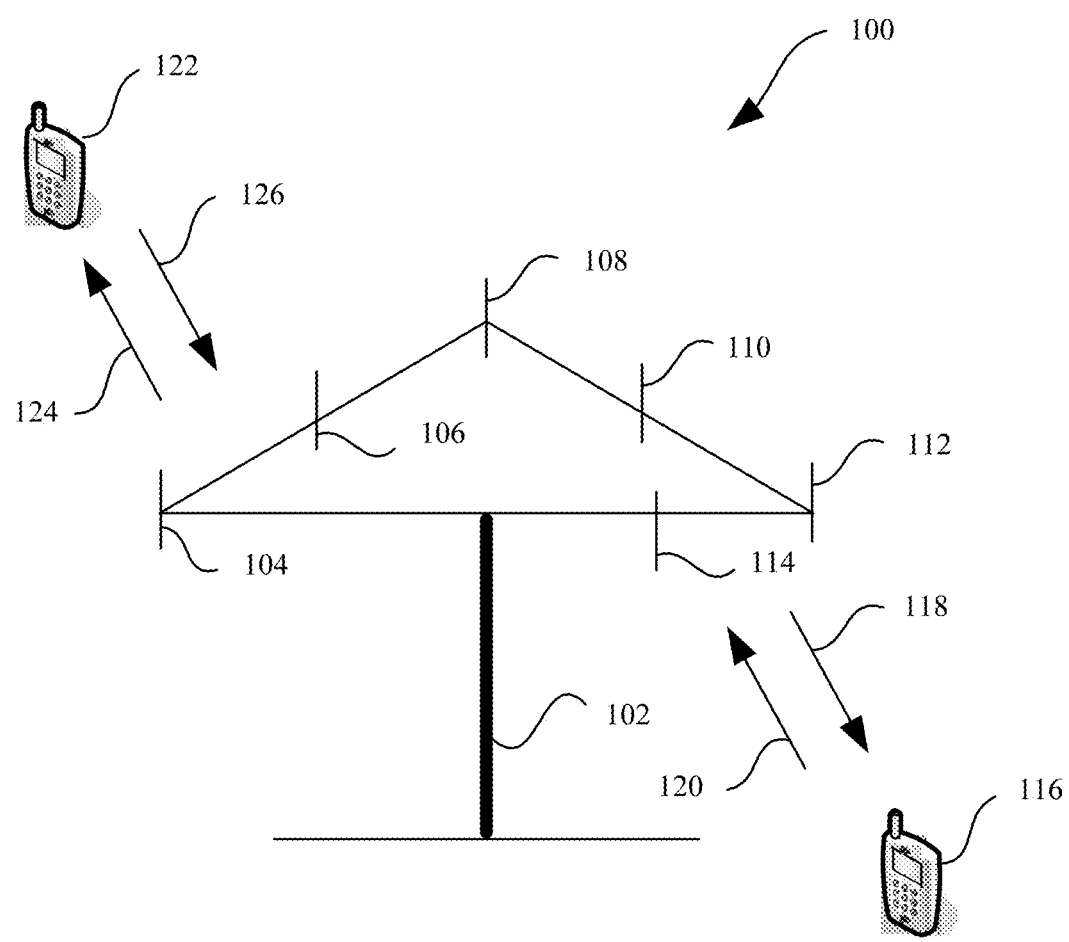
FIG. 1 is a schematic diagram of a wireless communications system to which an embodiment of this application is applied.

The following describes the technical solutions in the embodiments of this application with reference to the accompanying drawings in the embodiments of this application.

It should be understood that the technical solutions of the embodiments of this application may be applied to various communications systems, for example, wireless fidelity (Wi-Fi), worldwide interoperability for microwave access (WiMAX), a global system for mobile communications (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunications system (UMTS), a 5G system, and a cellular system related to the 3rd generation partnership project (3GPP). The embodiments of this application set no limitation.

The embodiments of this application may be used in wireless networks with different standards. An access network device may be different entity devices in different systems. For example, in long term evolution (LTE) and LTE-A, the access network device includes an eNodeB (eNB); and in wideband code division multiple access (WCDMA), the access network device includes a radio network controller (RNC) and/or a NodeB. Similarly, other wireless networks such as worldwide interoperability for microwave access (WiMax) may also use solutions similar to the solutions of the embodiments of this application.

It should be further understood that in the embodiments of this application, user equipment may also be referred to as a terminal device, a mobile station (MS), a mobile terminal, or the like. The user equipment may communicate with one or more core networks over a radio access network (RAN). For example, the user equipment may be a mobile phone (or referred to as a "cellular" phone), a computer having a communication function, or the like. For example, the user equipment may be a portable, pocket-sized, handheld, computer built-in, or in-vehicle mobile apparatus.

A method and an apparatus provided in the embodiments of this application may be applied to user equipment or a network device. The user equipment or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, such as a Linux operating system, a UNIX operating system, an Android operating system, an iOS operating system, or a Windows operating system. The application layer includes applications such as a browser, an address book, word processing software, and instant messaging software. In addition, in the embodiments of this application, a specific structure of an entity for performing a signal transmission method is not specially limited in the embodiments of this application, provided that the entity can run a program recording code of the signal transmission method in the embodiments of this application to perform communication based on the signal transmission method in the embodiments of this application. For example, a wireless communication method in the embodiments of this application may be performed by the user equipment or the network device, or by a functional module that is in the user equipment or the network device and that can invoke a program and execute the program.

In addition, aspects or features in the embodiments of this application may be implemented as a method, an apparatus or a product that uses standard programming and/or engineering technologies. The term "product" used in this application covers a computer program that may be accessed from any computer readable component, carrier or medium. For example, the computer-readable medium may include but is not limited to: a magnetic storage component (for example, a hard disk, a floppy disk, or a magnetic tape), an optical disc (for example, a compact disc (CD), a digital versatile disc (DVD)), a smart card and a flash memory component (for example, an erasable programmable read-only memory (EPROM), a card, a stick, or a key drive). In addition, various storage media described in this specification may indicate one or more devices and/or other machine readable media that are used to store information. The term "machine readable media" may include but is not limited to a radio channel, and various other media that can store, contain and/or carry an instruction and/or data.

It should be understood that, the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the embodiments of this application, "first" and "second" are only intended for distinction and do not imply sequences or sizes.

FIG. 1 is a schematic diagram of a wireless communications system 100 to which an embodiment of this application is applied. As shown in FIG. 1, the wireless communications system 100 includes an access network device 102. The access network device 102 may include one or more antennas, for example, antennas 104, 106, 108, 110, 112, and 114. In addition, the access network device 102 may further include a transmitter chain and a receiver chain. A person of ordinary skill in the art can understand that the transmitter chain and the receiver chain may include a plurality of components related to signaling sending and receiving (for example, a processor, a modulator, a multiplexer, a demodulator, a demultiplexer, or an antenna). The access network device 102 may communicate with a plurality of user equipment (for example, user equipment 116 and user equipment 122). However, it can be understood that the access network device 102 may communicate with any quantity of user equipment similar to the user equipment 116 or the user equipment 122.

As shown in FIG. 1, the user equipment 116 communicates with the antennas 112 and 114. The antennas 112 and 114 send information to the user equipment 116 over a forward link (also referred to as a downlink) 118, and receive information from the user equipment 116 over a reverse link (also referred to as an uplink) 120. In addition, the user equipment 122 communicates with the antennas 104 and 106. The antennas 104 and 106 send information to the user equipment 122 over a forward link 124, and receive information from the user equipment 122 over a reverse link 126.

Figure 2:
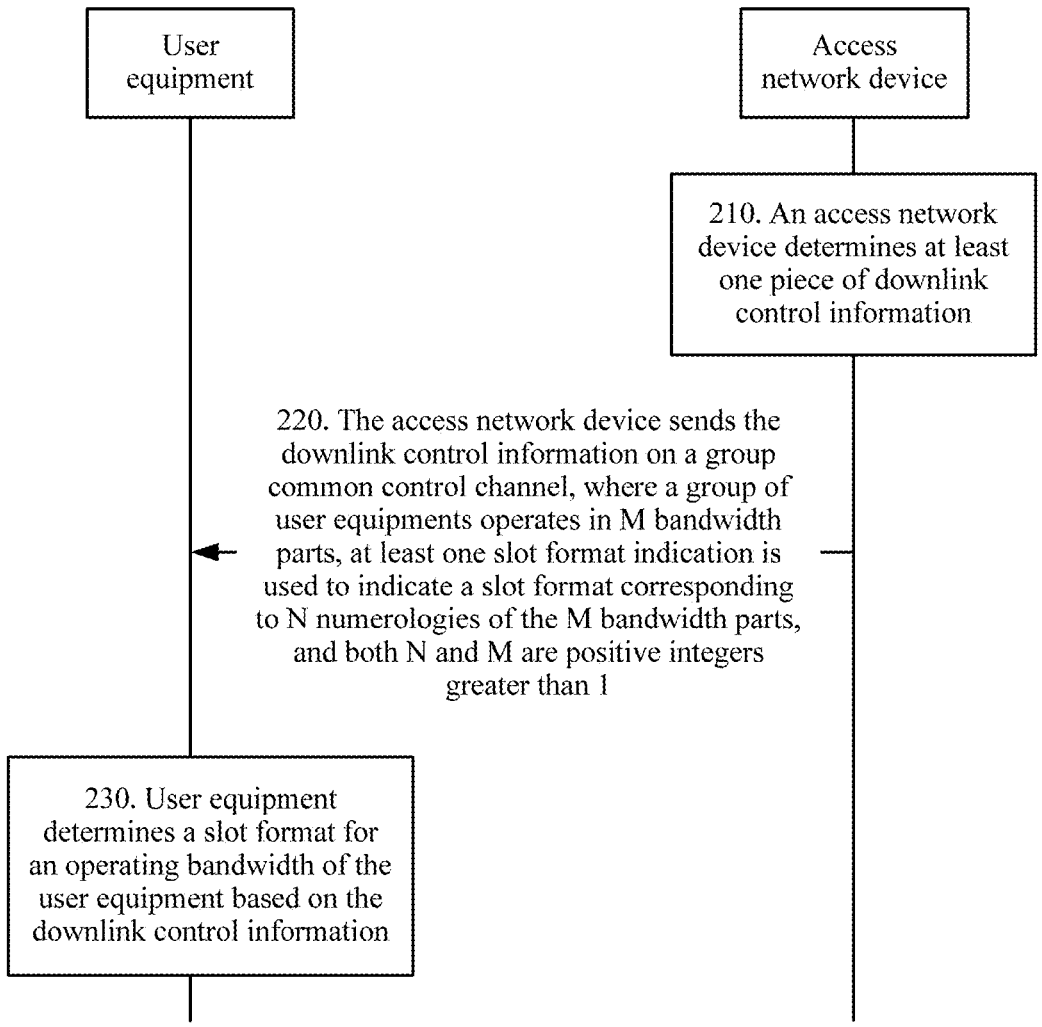
FIG. 2 is a schematic flowchart of a slot indication method according to an embodiment of this application.

FIG. 2 is a schematic flowchart of a slot indication method 200 according to an embodiment of this application. As shown in FIG. 2, the method 200 includes the following content.

210. An access network device determines at least one piece of downlink control information, where the downlink control information includes at least one slot format indication.

Optionally, the slot format indication is used to indicate a symbol type in one slot corresponding to a bandwidth part, for example, an uplink symbol, a downlink symbol, and/or another symbol in the slot. Specifically, the slot format indication may indicate which symbol/symbols is/are an uplink symbol/uplink symbols, which symbol/symbols is/are a downlink symbol/downlink symbols, and/or which symbol/symbols is/are another symbol/other symbols in one slot corresponding to a bandwidth part. The another symbol may include information other than uplink or downlink information, for example, a blank resource.

220. The access network device sends the downlink control information to a group of user equipment on a group common control channel, for example, a group common physical downlink control channel (group common PDCCH), where the group of user equipment operates in M bandwidth parts, the at least one slot format indication is used to indicate a slot format corresponding to N numerologies of the M bandwidth parts, and both N and M are positive integers greater than 1.

As shown in FIG. 2, one access network device may communicate with a plurality of user equipment. In this application file, "a group of user equipment" represents a plurality of user equipment. Optionally, a quantity of the group of user equipment is less than a quantity of all user equipment in a cell corresponding to the access network device.

The group common control channel is a common control channel used by the group of user equipment. The group of user equipment receives, on the group common control channel, common downlink control information sent by the access network device to the entire group of user equipment. The bandwidth parts corresponding to the slot format indicated by the downlink control information are bandwidth parts in which the group of user equipment operates. Correspondingly, the user equipment receive the downlink control information on the common downlink control channel.

A group of user equipment may operate in M bandwidth parts (BP). In other words, the access network device may allocate one or more bandwidth parts to each user equipment in the group of user equipment.

A numerology may be defined as including a plurality of basic parameters used for data transmission, for example, a subcarrier spacing and an OFDM symbol length, or including, for example, a slot length and a cyclic prefix (CP) length. Subcarrier spacings in a plurality of numerologies may be scaled by a multiple of $2^n$. For example, in a numerology, a subcarrier spacing is 15 kHz and slot duration of a normal CP is 0.5 ms; and in another numerology, a subcarrier spacing is 30 kHz and slot duration of a normal CP is 0.25 ms.

Optionally, the N numerologies of the M BPs in which the group of user equipment operates may be construed as N numerologies corresponding to the M BPs in which the group of user equipment operates, where M and N may be equal or may be unequal. For example, the group of user equipment includes user equipment A and user equipment B. The access network device configures two BPs for the user equipment A, and the two BPs correspond to two different numerologies. The access network device also configures two BPs for the user equipment B, and the two BPs also correspond to two different numerologies. If the two numerologies of the user equipment A are different from the two numerologies of the user equipment B, a quantity M of BPs of the group of user equipment is 4, and a quantity N of numerologies of the four BPs is also 4. If one of the two numerologies of the user equipment A is the same as one of the two numerologies of the user equipment B, a quantity M of BPs of the group of user equipment is 4, and a quantity N of numerologies of the four BPs is 3.

230. User equipment determines, based on the downlink control information, a slot format for a BP in which the user equipment operates.

Optionally, because the downlink control information includes the slot format corresponding to the N numerologies of the M operating bandwidth parts in which the group of user equipment operates, the user equipment may search, based on the downlink control information, for a numerology corresponding to the BP in which the user equipment operates, thereby obtaining the slot format corresponding to the BP of the user equipment.

In summary, the user equipment can obtain, by using the downlink control information, the slot format for the plurality of numerologies included in the BPs in which the user equipment operate. Therefore, when the user equipment operate in one or more BPs, the downlink control information on the group common control channel can be used to indicate, to each UE, a slot format used by a BP of the UE. This saves channel resources and improves transmission efficiency.

The following describes three specific implementations. In Implementation 1 and Implementation 2, the at least one slot format indication is N slot format indications. In other words, the downlink control information in the method 200 includes N slot format indications, and each slot format indication corresponds to one numerology. In Implementation 3, the at least one slot format indication is one reference slot format indication, the reference slot format indication is used to indicate a slot format for a reference numerology in the N numerologies, and the user equipment may determine a slot format for another numerology by using the slot format for the reference numerology.

Implementation 1

In the method 200, the downlink control information includes N information fields, each of the N information fields corresponds to one numerology, and each numerology corresponds to one slot format indication.

Figure 3:
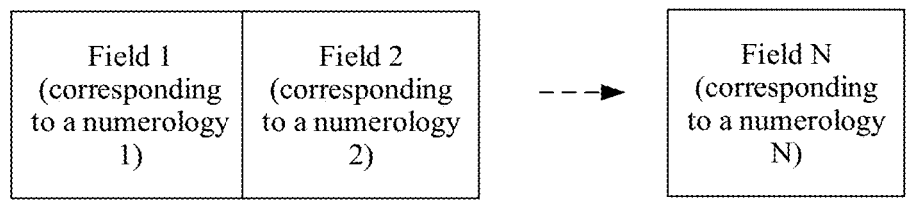
FIG. 3 is a schematic structural diagram of downlink control information in an implementation according to an embodiment of this application.

FIG. 3 is a schematic diagram of downlink control information in an implementation according to an embodiment of this application. The downlink control information includes N information fields: an information field 1 to an information field N, which respectively correspond to a numerology 1 to a numerology N.

Optionally, the N information fields are obtained through division on a bit basis. For example, the downlink control information includes 20 bits (c1, c2, . . . , and c20). An arrangement manner of these bits may be predefined. For example, first four bits correspond to the information field 1, second four bits correspond to the information field 2, and so on.

Optionally, the method further includes: sending, by the access network device, a correspondence between the N information fields and the N numerologies to the user equipment. For example, the information field 1 corresponds to the numerology 1, the information field 2 corresponds to the numerology 2, and so on.

In this implementation, the UEs can obtain slot format information of the numerology of the corresponding BP by detecting only one piece of downlink control information. This reduces detection complexity for the user equipment.

Implementation 2

In the method 200, the at least one piece of downlink control information is N pieces of downlink control information, and each of the N pieces of downlink control information corresponds to one slot format indication.

Figure 4:
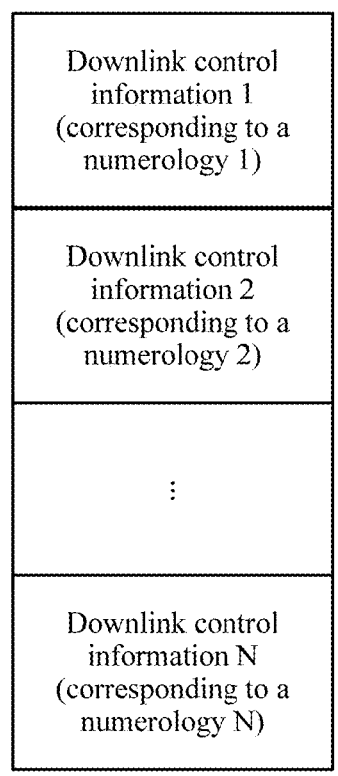
FIG. 4 is a schematic structural diagram of downlink control information in an implementation according to an embodiment of this application.

FIG. 4 is a schematic diagram of downlink control information in an implementation according to an embodiment of this application. The at least one piece of downlink control information includes N pieces of downlink control information: downlink control information 1 to downlink control information N, which respectively correspond to a numerology 1 to a numerology N.

Optionally, the N pieces of downlink control information correspond to the N numerologies, each of the N numerologies includes one identifier, and the identifier is used to scramble corresponding downlink control information. That the numerology includes one identifier may also be referred to as that the numerology corresponds to one identifier. For example, the numerology corresponds to one index, and the numerology can be found by using the index.

Optionally, the access network device may send a correspondence between a system identifier of each numerology and a slot type to the user equipment.

Optionally, when UE operates in one or more BPs, the UE may obtain only downlink control information corresponding to a numerology of the one or more BPs in which the UE operates. Therefore, in this implementation, each piece of downlink control information is for only one numerology. Therefore, the UE does not need to obtain all the N pieces of downlink control information, thereby reducing detection complexity and overheads for the UE.

Implementation 3

In the method 200, the at least one piece of downlink control information is one piece of downlink control information, the at least one slot format indication is one reference slot format indication, and the reference slot format indication is used to indicate a slot format for a reference numerology in the N numerologies.

That user equipment determines, based on the downlink control information, a slot format for a bandwidth part corresponding to the user equipment includes: determining, by the user equipment, a numerology of the bandwidth part in which the user equipment operates; and determining, by the user equipment, the slot format for the bandwidth part based on the reference numerology and the reference slot format.

Optionally, the user equipment determines the slot format for the bandwidth part based on the reference slot format and a correspondence of the reference numerology and a numerology of the bandwidth part.

Specifically, a plurality of numerologies are scaled in proportion, and the plurality of numerologies require subframe alignment. Therefore, after the access network device sends a reference slot format for one reference numerology to the user equipment, the user equipment may determine, based on a correspondence between the plurality of numerologies, a slot format for a numerology corresponding to one or more BPs in which the UE operates. Subframe alignment means that symbol types in a same time domain resource within a specific frequency domain range should be the same. For example, the symbol types are all uplink, all downlink, or all other types.

Optionally, a subcarrier spacing corresponding to the reference numerology is a minimum value of a subcarrier spacing corresponding to the N numerologies, or the reference numerology is a predefined numerology.

Optionally, when the subcarrier spacing corresponding to the reference numerology is the minimum value of the subcarrier spacing corresponding to the N numerologies, a manner for obtaining a slot type of another numerology is as follows: the another numerology has a same symbol type as the reference numerology in a same time domain resource.

Figure 5:
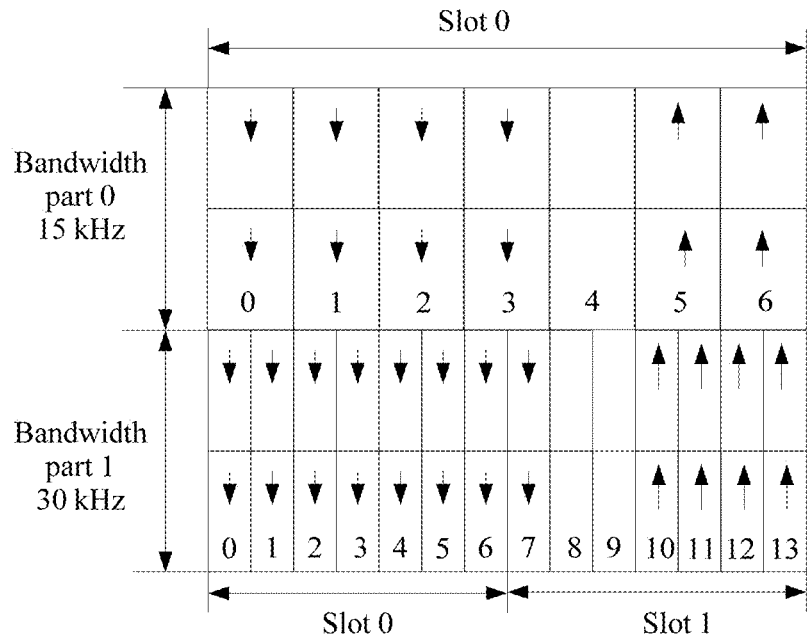
FIG. 5 is a schematic diagram of a correspondence between a bandwidth part and a numerology in an implementation according to an embodiment of this application.

FIG. 5 is a schematic diagram of a correspondence between a bandwidth part and a numerology in an implementation according to an embodiment of this application. As shown in FIG. 5, subcarrier spacings of two different numerologies of two BPs, for example, a BP 0 and a BP 1, are respectively 15 kHz and 30 kHz, and duration with normal CPs is respectively 0.5 ms and 0.25 ms. Therefore, in the duration of 0.5 ms, the BP 0 includes one slot, to be specific, seven symbols, for example, a symbol 0 to a symbol 6; and the BP 1 includes two slots, to be specific, 14 symbols, for example, a symbol 0 to a symbol 13. The symbol 0 to the symbol 3 in the BP 0 are downlink subframes, and symbols corresponding to the BP 1 in time domain resources occupied by the symbol 0 to the symbol 3 are the symbol 0 to the symbol 7. Therefore, the symbol 0 to the symbol 7 in the BP 1 should be downlink subframes. Similarly, the symbol s and the symbol 6 in the BP 0 are uplink subframes, and correspondingly, the symbol 10 to the symbol 13 in the BP 1 should be uplink subframes.

As shown in FIG. 5, because symbol alignment is required, the user equipment may determine a slot format for a numerology of the BP 1 by using a correspondence between a numerology of the BP 0 and a numerology of the BP 1 and by using a slot format for a reference numerology of the BP 0.

In this implementation, the access network device needs to send only one piece of downlink control information and a slot format corresponding to one numerology, thereby reducing overall overheads of the system and improving transmission efficiency.

According to the method in any one of the foregoing three implementations, a value of N is determined in at least one of the following manners: the value of N corresponds to a quantity of numerologies supported by the access network device; the value of N corresponds to a frequency range; or the value of N is indicated to the user equipment by the access network device by using a physical broadcast channel or a system message.

Optionally, the N numerologies of the M bandwidth parts may be construed as that N is a maximum quantity of numerologies supported by the access network device. In other words, the M BPs in which the current group of user equipment operates may not correspond to the maximum quantity of numerologies that can be supported by the access network device. However, the access network device may still send, to the group of user equipment, a slot format for all the numerologies that can be supported by the access network device. To be specific, the value of N corresponds to the maximum quantity of numerologies supported by the access network device. For example, three BPs in which the current group of user equipment operates may correspond to two numerologies, but the access network device can support a maximum of three numerologies. In this case, the access network device may still send the three numerologies to the group of user equipment. In this case, the three numerologies are still referred to as three numerologies of the three bandwidth parts.

Optionally, the value of N corresponds to the frequency range. For example, when the frequency range is less than 1 GHz, the value is 2; when the frequency range is 1 GHz to 6 GHz (including 1 GHz and 6 GHz), the value is 3; or the like.

Optionally, the access network device indicates the value of N to the user equipments by using a physical broadcast channel or a system message, for example, indicates the value of N to the user equipment by using a broadcast channel PBCH or a system message, for example, remaining minimum system information (RMSI).

Figure 6:
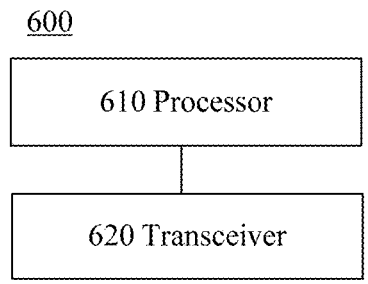
FIG. 6 is a schematic structural diagram of an access network device according to an embodiment of this application.

FIG. 6 is a schematic structural diagram of an access network device 600 according to an embodiment of this application. The access network device 600 includes: a processor 610, configured to determine at least one piece of downlink control information, where the downlink control information includes at least one slot format indication; and a transceiver 620, configured to send the downlink control information to a group of user equipment on a group common downlink control channel, where the group of user equipment operates in M bandwidth parts, the at least one slot format indication is used to indicate a slot format corresponding to N numerologies of the M bandwidth pails, and both N and M are positive integers greater than 1.

Optionally, the slot format includes a symbol type in one slot. The symbol type is, for example, an uplink symbol, a downlink symbol, or another symbol.

Optionally, the at least one slot format indication is N slot format indications.

Optionally, the at least one piece of downlink control information is one piece of downlink control information, the downlink control information includes N information fields, and each of the N information fields corresponds to one slot format indication.

Optionally, the N information fields are obtained through division on a bit basis.

Optionally, a correspondence between the N information fields and the N numerologies is sent to the user equipment.

Optionally, the at least one piece of downlink control information is N pieces of downlink control information, and each of the N pieces of downlink control information corresponds to one slot format indication.

Optionally, the N pieces of downlink control information correspond to the N numerologies, each of the N numerologies includes one identifier, and the identifier is used to scramble corresponding downlink control information.

Optionally, the at least one piece of downlink control information is one piece of downlink control information, the at least one slot format indication is one reference slot format indication, and the reference slot format indication is used to indicate a slot format for a reference numerology in the N numerologies.

Optionally, a subcarrier spacing corresponding to the reference numerology is a minimum value of a subcarrier spacing corresponding to the N numerologies; or the reference numerology is a predefined numerology.

Optionally, a value of N is determined in at least one of the following manners: the value of N corresponds to a quantity of numerologies supported by the access network device; the value of N corresponds to a frequency range; or the value of N is indicated to the user equipment by the access network device by using a physical broadcast channel or a system message.

It should be understood that the access network device 600 in this embodiment of this application may correspond to the access network device in the slot indication method in the embodiments of this application. In addition, the foregoing and other management operations and/or functions of the modules in the access network device 600 are respectively intended for implementing corresponding steps in the foregoing methods. For brevity, details are not described herein again.

In summary, the access network device may send, to the group of user equipment by using the downlink control information, the slot format for the plurality numerologies of the BPs in which the group of user equipment operates. Therefore, when the user equipment operate in one or more BPs, the downlink control information on the group common control channel can be used to indicate, to each UE, a slot format used by a BP of the UE. This saves channel resources and improves transmission efficiency.

Figure 7:
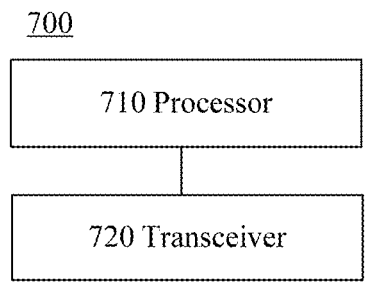
FIG. 7 is a schematic structural diagram of user equipment according to an embodiment of this application.

FIG. 7 is a schematic structural diagram of an user equipment 700 according to an embodiment of this application. The user equipment 700 includes: a transceiver 720, configured to receive, on a group common downlink control channel, at least one piece of downlink control information sent by an access network device to a group of user equipment, where the user equipment is one of the group of user equipment, the downlink control information includes at least one slot format indication, the group of user equipment operates in M bandwidth pails, the at least one slot format indication is used to indicate a slot format corresponding to N numerologies of the M bandwidth pails, and both N and M are positive integers greater than 1; and a processor 710, configured to determine, based on the downlink control information, a slot format for a bandwidth part corresponding to the user equipment.

Optionally, the slot format includes a symbol type in one slot.

Optionally, the at least one slot format indication is N slot format indications.

Optionally, the at least one piece of downlink control information is one piece of downlink control information, the downlink control information includes N information fields, and each of the N information fields corresponds to one slot format indication.

Optionally, the N information fields are obtained through division on a bit basis.

Optionally, a correspondence between the N information fields and the N numerologies that is sent by the access network device to the user equipment is received.

Optionally, the at least one piece of downlink control information is N pieces of downlink control information, and each of the N pieces of downlink control information corresponds to one slot format indication.

Optionally, the N pieces of downlink control information correspond to the N numerologies, each of the N numerologies includes one identifier, and the identifier is used to scramble corresponding downlink control information.

Optionally, the at least one piece of downlink control information is one piece of downlink control information, the at least one slot format indication is one reference slot format indication, and the reference slot format indication is used to indicate a slot format for a reference numerology in the N numerologies.

That the processor determines, based on the downlink control information, the slot format for the bandwidth part specifically includes that the processor determines the slot format for the bandwidth part based on the reference numerology and the reference slot format.

Optionally, a subcarrier spacing corresponding to the reference numerology is a minimum value of a subcarrier spacing corresponding to the N numerologies; or the reference numerology is a predefined numerology.

Optionally, a value of N is determined in at least one of the following manners: the value of N corresponds to a quantity of numerologies supported by the access network device; the value of N corresponds to a frequency range; or the value of N is indicated to the user equipment by the access network device by using a physical broadcast channel or a system message.

It should be understood that the user equipment 700 in this embodiment of this application may correspond to the user equipment in the slot indication method in the embodiments of this application. In addition, the foregoing and other management operations and/or functions of the modules in the user equipment 700 are respectively intended for implementing corresponding steps in the foregoing methods. For brevity, details are not described herein again.

In summary, the user equipment can obtain, by using the downlink control information, the slot format for the plurality of numerologies included in the BPs in which the user equipment operate. Therefore, when the user equipment operate in one or more BPs, the downlink control information on the group common control channel can be used to indicate, to each UE, a slot format used by a BP of the UE. This saves channel resources and improves transmission efficiency.

The memory in the foregoing embodiments may include a volatile memory, for example, a random access memory (RAM). The memory may also include a non-volatile memory, for example, a flash memory, a hard disk drive (HDD), or a solid-state drive (SSD). The memory may further include a combination of the foregoing types of memories.

The processor in the foregoing embodiments may be a central processing unit (CPU), a network processor (NP), or a combination of a CPU and an NP. The processor may further include a hardware chip. The foregoing hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. For specific applications, a person skilled in the art may use different methods to implement the described functions; however, this implementation should not be construed as going beyond the scope of the embodiments of this application.

It may be clearly understood by a person skilled in the art that, for the purpose of convenient and brief description, for a detailed working process of the system, apparatus, and unit described above, reference may be made to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division, and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the embodiments of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: various media that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving downlink control information, wherein the downlink control information is received using a group common downlink control channel, the downlink control information indicates a reference slot format, the reference slot format corresponds to a reference numerology, and the group common downlink control channel is common to a group of user equipment (UEs); and
   determining, based on the reference numerology, the reference slot format, and a numerology corresponding to a bandwidth part, a slot format corresponding to the bandwidth part;
   wherein the group of UEs operates in M bandwidth parts, the reference slot format is for a reference numerology in N numerologies of the M bandwidth pails, wherein both N and M are positive integers greater than 1, and wherein:

a value of N corresponds to a frequency range; or the value of N is indicated using a physical broadcast channel or a system message.

2. The method according to claim 1, wherein the numerology corresponding to the bandwidth part is different from the reference numerology.

3. The method according to claim 1, wherein the reference slot format indicates a symbol type in one slot.

4. The method according to claim 1, wherein the reference slot format is usable by UEs of the group of UEs to determine a slot format corresponding to the N numerologies of the M bandwidth parts.

5. The method according to claim 1, wherein:

a subcarrier spacing corresponding to the reference numerology is a minimum value of a subcarrier spacing corresponding to the N numerologies; or the reference numerology is a predefined numerology.

6. An apparatus, comprising:

a transceiver, configured to receive downlink control information, wherein the downlink control information is received using a group common downlink channel, the downlink control information indicates a reference slot format, the reference slot format corresponds to a reference numerology, and the group common downlink channel is common to a group of user equipment (UEs);

a processor; and a non-transitory computer-readable storage medium storing a program to be executed by the processor, the program including instructions for:

determining, based on the reference numerology, the reference slot format, and a numerology corresponding to a bandwidth part, a slot format corresponding to the bandwidth part;

wherein the group of UEs operates in M bandwidth parts, the reference slot format is for a reference numerology in N numerologies of the M bandwidth pails, wherein both N and M are positive integers greater than 1, and wherein:

a value of N corresponds to a frequency range; or the value of N is indicated using a physical broadcast channel or a system message.

7. The apparatus according to claim 6, wherein the numerology corresponding to the bandwidth part is different from the reference numerology.

8. The apparatus according to claim 6, wherein the reference slot format indicates a symbol type in one slot.

9. The apparatus according to claim 6, wherein the reference slot format is usable by UEs of the group of UEs to determine a slot format corresponding to N numerologies of the M bandwidth parts.

10. The apparatus according to claim 6, wherein:

a subcarrier spacing corresponding to the reference numerology is a minimum value of a subcarrier spacing corresponding to the N numerologies; or the reference numerology is a predefined numerology.

11. A non-transitory computer-readable medium comprising instructions which, when executed by a computer, cause the computer to:

receive downlink control information, wherein the downlink control information is received using a group common downlink control channel, the downlink control information indicates a reference slot format, the reference slot format corresponds to a reference numerology, and the group common downlink control channel is common to a group of user equipment (UEs); and determine, based on the reference numerology, the reference slot format, and a numerology corresponding to a bandwidth part, a slot format corresponding to the bandwidth part;

wherein the group of UEs operates in M bandwidth parts, the reference slot format is for a reference numerology in N numerologies of the M bandwidth pails, wherein both N and M are positive integers greater than 1, and wherein:

a value of N corresponds to a frequency range; or the value of N is indicated using a physical broadcast channel or a system message.

12. The non-transitory computer-readable medium according to claim 11, wherein the numerology corresponding to the bandwidth part is different from the reference numerology.

13. The non-transitory computer-readable medium according to claim 11, wherein the reference slot format indicates a symbol type in one slot.

14. The non-transitory computer-readable medium according to claim 11, wherein:

a subcarrier spacing corresponding to the reference numerology is a minimum value of a subcarrier spacing corresponding to the N numerologies; or the reference numerology is a predefined numerology.

* * * * *

UNITED STATES PATENT AND TRADEMARK OFFICE
CERTIFICATE OF CORRECTION

PATENT NO. : 11,082,969 B2  
APPLICATION NO. : 16/686752  
DATED : August 3, 2021  
INVENTOR(S) : Zhenfei Tang Page 1 of 1

It is certified that error appears in the above-identified patent and that said Letters Patent is hereby corrected as shown below:

In the Claims

Claim 1, Column 15, Line 1; delete "pails" and insert --parts--

Claim 6, Column 15, Line 39; delete "pails" and insert --parts--

Claim 11, Column 16, Line 28; delete "pails" and insert --parts--

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*